May 8, 1928.
A. J. LIBERT
1,669,137
TOOL HOLDER
Filed June 6, 1925
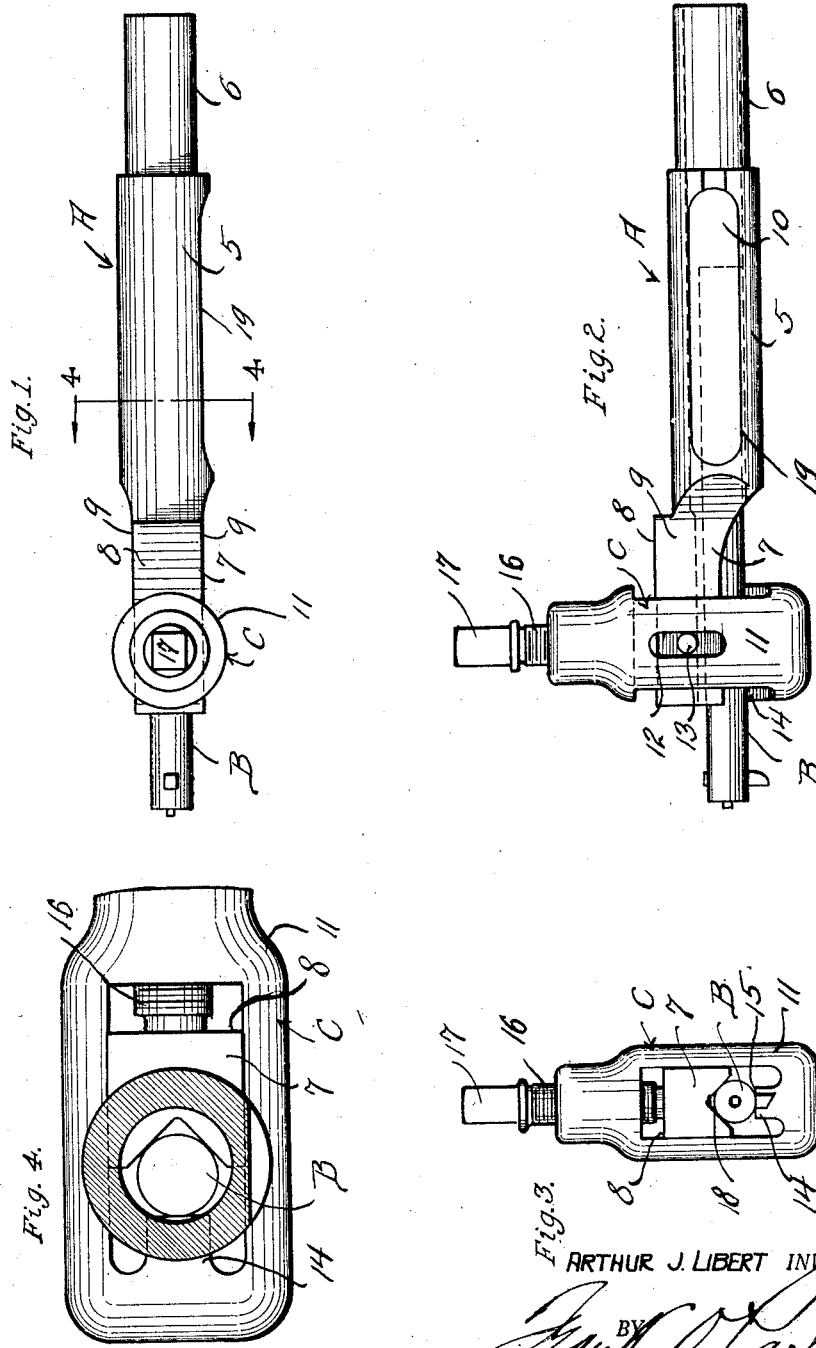
ARTHUR J. LIBERT INVENTOR.
BY
ATTORNEYS.

Patented May 8, 1928.

1,669,137

UNITED STATES PATENT OFFICE.

ARTHUR J. LIBERT, OF GREEN BAY, WISCONSIN.

TOOL HOLDER.

Application filed June 6, 1925. Serial No. 35,404.

The invention relates to tool holders, and more especially to the class of boring-tool holders.

The primary object of the invention is the provision of a tool holder of this character, wherein the construction thereof is novel in form so that the tool when placed therein will extend into the body of said holder, and said tool readily and easily adjusted in and out of the latter, and is firmly held in adjusted position.

Another object of the invention is the provision of a tool holder, wherein the construction thereof specially adapts the same for use in a turret attachment for lathes forming the subject matters of Letters Patent No. 1,518,156, issued to me under date of December 9, 1924, the holder being adapted to hold straight shank drills, centering tools, and takes the place of a chuck on the turret attachment hereinbefore referred to.

A further object of the invention is the provision of a holder of this character, wherein the tool when placed herein will be properly centered in a horizontal plane, while the carriage of the lathe on which the holder is carried will permit of the centering of the tool and holder in the longitudinal and vertical planes of the said lathe.

A still further object of the invention is the provision of a tool holder of this character, wherein the clamp for the tool is mounted on the holder and operates in a novel manner for the adjustable securing of the said tool in the holder.

A still further object of the invention is the provision of a tool holder of this character, which is extremely simple in its make up and construction, thoroughly reliable and efficient in its purposes, strong, durable, and inexpensive in the manufacture.

With these and other objects in view the invention consists in the features of construction, combination and arrangement of parts as will be hereinafter fully described in detail, illustrated in the accompanying drawing, which discloses the preferred embodiment of the invention, and pointed out in the claim hereunto appended.

In the accompanying drawing:

Figure 1, is a plan view of the tool holder constructed in accordance with the invention, showing the boring tool mounted therein.

Figure 2, is a side elevation thereof.

Figure 3, is an end elevation.

Figure 4, is an enlarged fragmentary sectional view taken on the line 4—4 of Figure 1, looking in the direction of the arrow.

Similar reference characters indicate corresponding parts throughout the several views in the drawing.

Referring to the drawing in detail, A, designates generally the tool holder, and B, the boring bar, while supported on one end of said holder is the clamp C, the latter and the holder being hereinafter fully described.

The holder A, comprises a hollow body 5, preferably tubular in formation, one end being exteriorly reduced as at 6, for the mounting of said holder in the turret attachment, not shown, of a lathe, while the other end is offset relative to the central longitudinal axis of the holder to provide a stationary jaw 7, the same being formed with a V-shaped notch 18, extending longitudinally in the center of the lower face, for receiving the boring bar B, and the upper face 8, of this jaw 7, is flat, as well as opposite sides 9, thereof.

The boring bar B, is adapted to slide in and out of the hollow center 10, of the body 5, of the holder, for the proper length of said boring bar when in use. On the jaw 7, of the holder A, is mounted the clamp C, which is in the form of an elongated yoke 11, the opposite sides being formed with slots 12, into each of which projects a pin 13, mounted in the stationary jaw 7, so that the clamp is slidably connected with the latter.

Internally of the yoke opposite the notched lower face of the jaw 7, is formed a raised rib 14, provided with a flat face 15, constituting a fulcrum or seat for the boring bar B, while threaded in top of the yoke 11, is a clamping screw 16, which has its inner end working against the flat face 8, of the stationary jaw 7, so that by turning the said screw inwardly the yoke 11, will be drawn upwardly relative to the jaw, and the boring bar B, will be securely clamped and centered in the holder A, between the jaw 7, and the rest or seat 15.

The outer end of the screw 16, is squared to provide a wrench engaging terminal 17, whereby the screw can be manually turned in or out of the clamp for securing or releasing the boring bar B, or the tool inserted in the holder.

The notch 18, in the jaw 7, serves to center the tool when placed in the holder A, that is to say, in a horizontal plane, while the adjustment of the carriage of the lathe supporting the tool holder will permit of the centering of the tool in the longitudinal vertical plane, as will be apparent.

It will be apparent that the holder A, is adapted for use with tools of different sizes and shapes, namely, round, hexagon and octagon bars, which are the standard forms.

The body 5, of the tool holder A, longitudinally thereof along one side is provided with a sight opening 19, to enable the user of the holder or operator of the lathe with which it is used to determine accurately the extent to which the bar or tool B, has been telescoped into said holder A.

The yoke 11, embraces the stationary jaw 7, of the holder A, and is vertically adjustable thereon by the screw 16, so that the seat or rest 15, in said yoke 11, when the latter is moved in one direction, will force the tool or bar B, into the notch 18, in said jaw 7, whereby the latter and the yoke will firmly secure the boring bar or tool B, in the holder A.

What is claimed is:

A tool holder of the kind described, comprising a hollow tubular elongated body constructed and arranged to adjustably receive telescopically a tool therein, a flat faced jaw on one end of the body and having an inverted substantially V-shaped notch in its inner face to receive and center the tool when fitted in the hollow body, an adjustable clamping yoke having a flat faced opening embracing the jaw, a vertical flat top rib rising from one end of the opening in the yoke to confront the notch, and pin and slot connections between the body and yoke for guiding the same relative to each other.

In testimony whereof I affix my signature.

ARTHUR J. LIBERT.